3 Sheets—Sheet 1.
N. WHITEHALL.
CONVERTIBLE SEEDER AND CULTIVATOR.
No. 187,073. Patented Feb. 6, 1877.
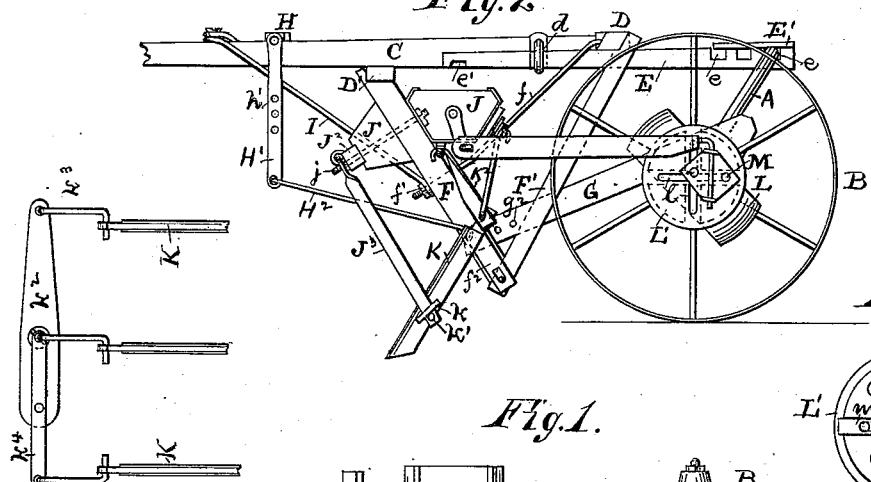
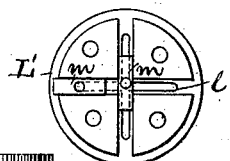
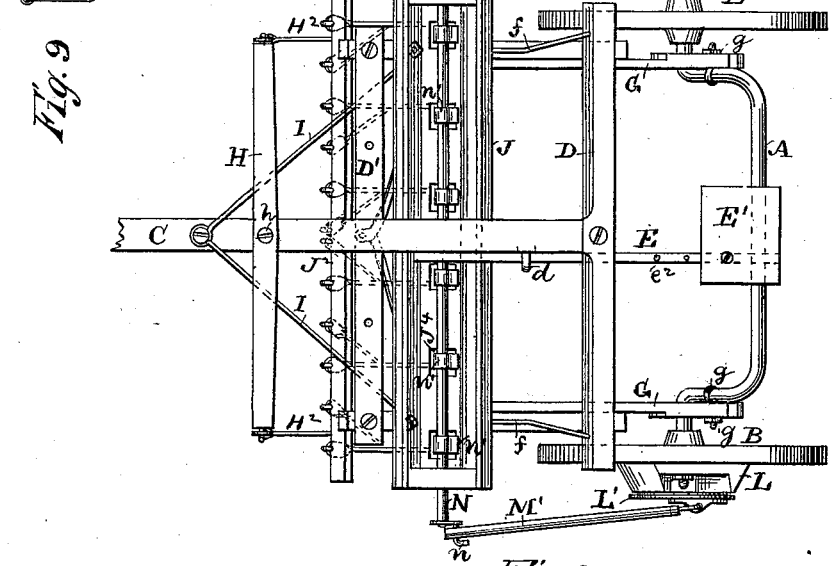
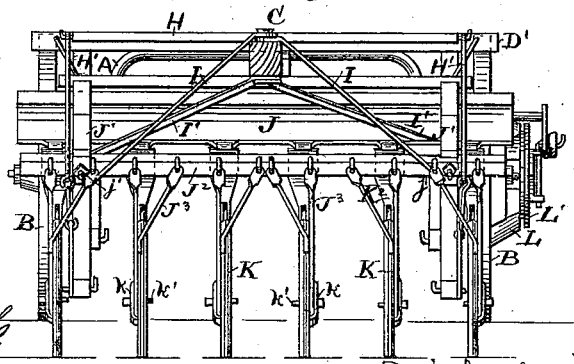
Witnesses: L. Van Ripswick, D. G. Stuart
Inventor: Nicholas Whitehall, A. McCallum Atty.
N. PETERS, PHOTO-LITHOGRAPHER, WASHINGTON, D.C.

N. WHITEHALL.
CONVERTIBLE SEEDER AND CULTIVATOR.
No. 187,073. Patented Feb. 6, 1877.
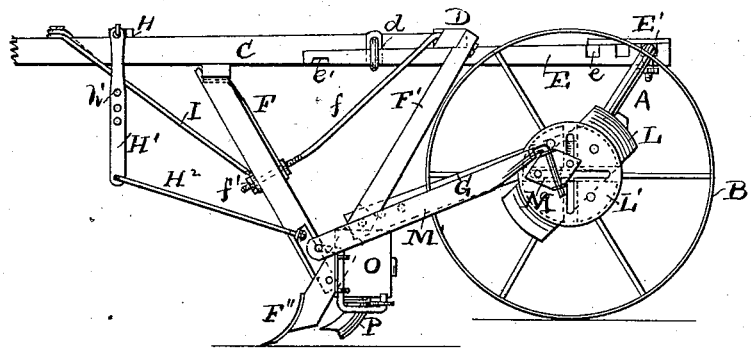
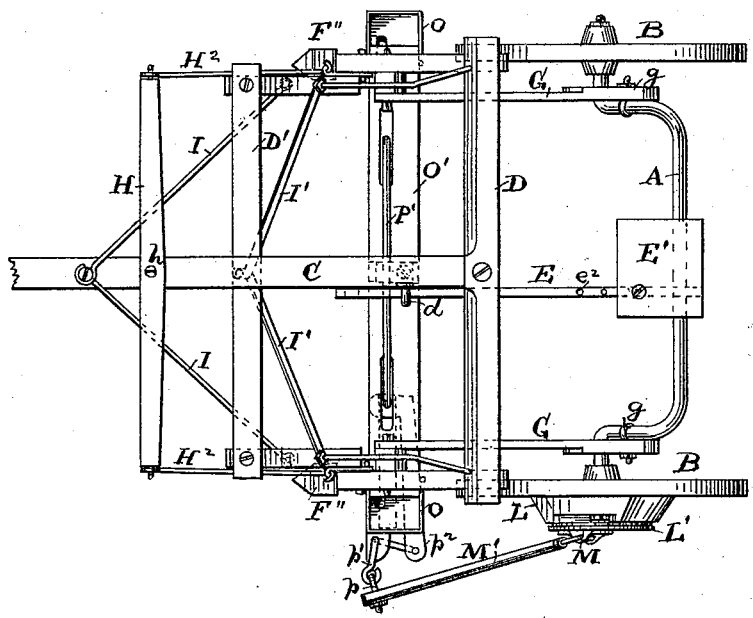

3 Sheets—Sheet 3.

N. WHITEHALL.
CONVERTIBLE SEEDER AND CULTIVATOR.

No. 187,073. Patented Feb. 6, 1877.

Witnesses.
L. Van Opswick.
D. G. Stuart.

Inventor.
Nicholas Whitehall
By A. McCallum
Atty.

N. PETERS, PHOTO-LITHOGRAPHER, WASHINGTON, D. C.

UNITED STATES PATENT OFFICE.

NICHOLAS WHITEHALL, OF NEWTOWN, INDIANA.

IMPROVEMENT IN CONVERTIBLE SEEDER AND CULTIVATOR.

Specification forming part of Letters Patent No. 187,073, dated February 6, 1877; application filed April 18, 1876.

*To all whom it may concern:*

Be it known that I, NICHOLAS WHITEHALL, of Newtown, in the county of Fountain and State of Indiana, have invented certain new and useful Improvements in Convertible Seeders and Cultivators; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention relates to agricultural implements; and the invention consists in certain new and improved devices and combinations of devices, whereby, as occasion requires, the same machine may be adapted for use as a seed-drill, a corn-planter, and corn-cultivator, and as these different farming operations are performed at different seasons of the year my convertible machine serves the purposes of three different machines, as hereinafter more fully set forth.

Figure 7:
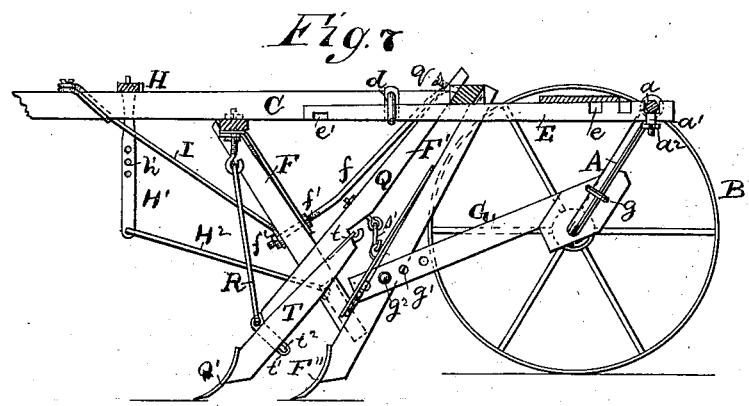
Figure 6:
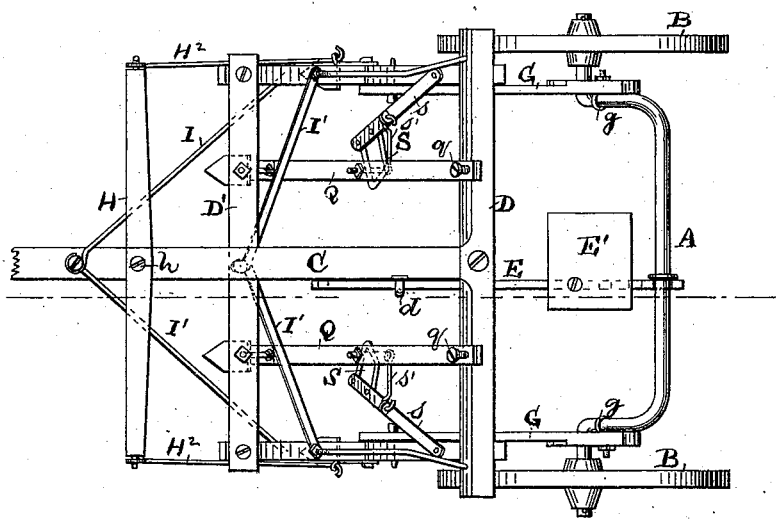

In the accompanying drawings, Figure 1 is a plan view of my convertible machine arranged as a seed-drill. Fig. 2 is a side elevation, and Fig. 3 is a front elevation, of the same. Fig. 4 is a plan view of the machine arranged as a corn-planter, and Fig. 5 is a side elevation of the same. Fig. 6 is a plan view of the machine arranged as a corn-cultivator, and Fig. 7 is a side elevation of the same. Figs. 8 and 9 are details of parts of the machine.

Referring to the parts by letters, A represents an axle, the central portion of which is elevated, and the ends bent outward laterally, so as to form spindles for the supporting-wheels B B. C is the tongue or draft-pole, to the rear end of which a cross-bar, D, is rigidly secured. D' is a cross-bar, which is also rigidly secured to the draft-bar C at a point between its rear end and the whiffletree, or point at which the draft is applied. $d$ is a staple or hook, secured to the draft-pole at a point between the cross-bars D D'. E is a bar, the forward end of which is passed through or beneath the staple or hook $d$, and the rear end of which is connected with the central portion of the axle A by means of an eyebolt, $a$, clamp $a^1$, and nut $a^2$, the axle fitting into a lateral groove, $e$, formed in the upper side of the bar E. There are a series of these grooves $e$, so that the bar E may be adjusted back and forward on the axle. $e^1$ is a lateral groove, formed in the under side of the bar E near its forward end. A series of vertical bolt-holes, $e^2$, are also formed through the bar E, for the purpose of adjusting the seat E' back and forward on the bar E, as occasion requires. F F are diagonal bars, the upper ends of which are secured, one to each end of the cross-bar D', and $F^1 F^1$ are similar bars; or they may be the standards of cultivator-shovels, as shown in Figs. 5 and 7 of the drawings. The bars or standards $F^1$ are secured to the cross-bar D, one to each end, and their lower ends are secured to the lower ends of the bars F, so that the two sets of bars F and $F^1$ form a V-shaped frame, as clearly shown by Fig. 2 of the drawings. $ff$ are brace-rods, which connect the bars F with the bar D, their lower ends being threaded, and provided with washers and nuts, as shown at $f^1$. G G are bars, the rear ends of which are secured to the axle A by eyebolts $g\,g$, and their forward ends are formed with a series of bolt-holes, $g^1$, through one or other of which a screw pivot-bolt, $g^2$, is passed and secured to the bars F. H is the whiffletree or evener-bar, pivoted to the draft-pole at $h$. $H^1$ are pendent draft bars or rods, the upper ends of which are pivoted to the ends of the evener-bar, and their lower ends connected by link-rods $H^2$ with the bars F or plates $f^2$, secured to the bars F. The pendent bars $H^1$ are formed with a series of holes, $h'$, to either of which the single-trees may be attached. I I are brace-rods, connecting the draft-pole with the bars F, and I' I' are braces, which connect the bars F with the cross-bar D' and draft-pole C.

The parts of the machine hereinbefore described constitute the frame of my convertible machine, said frame being used for all purposes. To convert this frame into a seed-drill, I attach the seed-box J by two bolts, $j$, which are passed through the bars F, and also through blocks $J^1$ and cross-bar $J^2$, the nuts $j'$ securing all together. $J^3$ represents a series of drag-bars, pivoted to the cross-bar $J^2$, and attached by their lower ends to the drills K, by staples $k$ and wooden break-pins $k^1$. $K^1$ are tubes or ducts, hooked or pivoted to the under side of the seed-box, and pivoted at their other ends to the upper ends of the drills. $k^2$ is a lever, pivoted to the rear side of the seed-box, its inner end connected to the upper end of one of the drills by a link, $k^3$, and at its other end to another lever, $k^4$, the ends of which are connected by links to the next two adjacent drills. The three drills on the other side of the machine are connected in a similar manner. $J^4$ is a sliding bar on the under side of the seed-box, perforated with holes corresponding to the holes in the bottom of the seed-box. By means of this sliding bar the size of the holes in the seed-box may be adjusted so as to suit different kinds of seed.

L is a block, secured to the hub of the wheel B, to the outer side of which is secured a disk, L', having four radial slots, $l$. The inner side of this disk is slightly enlarged, the enlargement being grooved so as to correspond with the radial slots. M is a plate of square or angular form, two of its angles being bent outwardly, so as to form perforated lugs, for the purpose hereinafter set forth.

$m\ m$ are two followers, pivoted or journaled to the plate M, and arranged to slide back and forth in grooves formed on the inner side of the disk L', their journals or pivot-bolts passing through the radial slots $l$. M' is a connecting-rod, having a bent end, which passes through the lugs on the plate or disk M, its other end being pivoted to a crank, $n$, which crank is secured to the end of a rod, N, which passes through and is journaled in the ends of the seed-box J. To this rod N stirring devices $n'$ are secured at points immediately over the openings in the bottom of the seed-box.

The operation of the machine as a drill is as follows: As the wheels revolve in the forward passage of the machine a reciprocating or oscillating motion is imparted to the stirrers $n'$ upon the rod N, by means of the connecting-rod M' and the plate M, the followers journaled to which plate traveling alternately in the grooves of disk L', imparting the necessary movement to the connecting-rod. The seed within the seed-box is thus kept constantly agitated, the stirrers pressing and brushing it, thereby causing it to pass through the holes in the bottom of the seed-box, from whence it is conducted, by tubes or ducts $K^2$, to the drills K, through which it falls into the furrows opened by the drill-teeth for its reception.

The peculiar arrangement of the drills—that is, their being pivoted, the one to the other, by the levers $k^2\ k^4$ and links $k^3$—permits of each drill adjusting itself vertically, so as to pass over stones or inequalities in the ground without rising too far, or so as not to open the furrow for the reception of the seed; and should the drills come in contact with an obstacle over which they cannot rise, the wooden break-pins $k^1$ will first give way and permit the drill to turn or rise upward over the object without becoming broken.

To convert the machine into a corn-planter, the seed-box and drill apparatus are removed, and, instead of the bars $F^1$, standards with cultivator-shovels $F^2$ are connected with the bars F.

These shovels operate as furrow-openers, immediately in front of the seed-boxes O O, which are secured, and made part of a removable frame, O', which is bolted to the standards $F^1$ by bolts or screws, which pass through the standards, and through diagonal blocks secured to the inner sides of the seed-boxes.

The seed passes out through an opening in the inner side of the box, and falls onto a perforated plate, which slides or reciprocates beneath the seed-box, and through a perforated guide-plate, which also operates as a cut-off. When the hole in the sliding plate comes immediately above the hole in the guide-plate the corn will drop through, and pass by the tube P into the furrow opened for its reception by the shovel or tooth $F^2$.

Each seed-box is provided with a seed-dropper of this construction, and the sliding bars are connected by a rod, P', and operated by the revolution of the wheels B, the connecting-rod M', plate M, and disk L, the connecting-rod M' being attached by a staple, $p$, with a bent rod, $p^1$, journaled to the seed-box O, and connected with the rod P' by another connecting-rod, $p^2$.

It will thus be seen that by attaching the seed-box frame O O to the machine, and connecting the rod M' to the staple $p$, the machine is converted into a double-row corn-planter, which operates to drill or drop the corn automatically.

To convert the machine into a straddle-row corn-cultivator, the seed-dropping attachment is removed, and the block L, which sustains the device for imparting motion to the seeding apparatus, may also be removed. Two additional shovel-standards, Q Q, are then attached to the frame between the two outer ones, one on each side of the draft-pole. The upper ends of these shovel-standards Q are pivoted to the cross-bar D by screws $q$, and their lower ends are connected with the cross-bar D' by shackles or loose rods R, which will permit of the standards, with their shovels, being moved laterally by means of stirrups S on the ends of pivoted suspension-bars $s$, which are loosely shackled by links $s'$ to the standards Q. The shovels Q' are secured to standards T, which are pivoted to the standards Q, as shown at $t$, and attached to the lower ends by a slotted plate, $t^1$, which passes through the standard T, a wooden break-pin, $t^2$, securing all together.

By this arrangement it will be seen that, should the shovel come in contact with an obstacle, the wooden pin will give way, and allow the standard T to turn on its pivot *t* without breaking.

When used as a cultivator, the seat E' is moved forward, so that the driver's feet can conveniently rest on the stirrups S, and by the pressure of his feet the shovels on the standard T may be moved laterally, so as to avoid plowing out any corn which may be growing a little to one side of the row.

Having thus described my invention, what I claim as new, and desire to secure by Letters Patent, is—

1. The frame consisting of the draft-pole C, cross-bars D D', diagonal bars F F¹, adjustable bars G G and E, axle A, and wheels B B, constructed and arranged as described, so as to be convertible into a seed-drill, corn-planter, or corn-cultivator, substantially as and for the purposes specified.

2. The block L, slotted disk L', plate M, followers *m*, and rod M', operating in combination with the wheel B, for imparting an oscillating motion to the agitator, substantially as and for the purpose specified.

In testimony that I claim the foregoing as my own I affix my signature in presence of two witnesses.

NICHOLAS WHITEHALL.

Witnesses:
SAMUEL LOW,
PLEASANT HAAS.